March 4, 1969  E. SWAINSON  3,430,304
SLIDING CLASP FASTENER STRINGERS
Filed Jan. 19, 1967  Sheet 4 of 4

INVENTOR
ERIC SWAINSON

By
Cushman, Darby & Cushman
ATTORNEYS

United States Patent Office 3,430,304
Patented Mar. 4, 1969

3,430,304
SLIDING CLASP FASTENER STRINGERS
Eric Swainson, Sutton Coldfield, England, assignor to Lightning Fasteners Limited, Birmingham, England, a corporation of Great Britain
Filed Jan. 19, 1967, Ser. No. 610,289
Claims priority, application Great Britain, Jan. 31, 1966, 4,183/66
U.S. Cl. 24—205.1          12 Claims
Int. Cl. A44b *19/00*

ABSTRACT OF THE DISCLOSURE

A sliding clasp fastener having a stringer tape with apertures through which coupling elements of the fastener project. The tape has a fold adjacent the apertures and a portion of the tape extending from the fold conceals parts of the elements. This tape portion is not secured to the elements. An abutment provided between this tape portion and the elements, the abutment engages the tape at the fold to prevent movement of the fold away from the coupling heads of the elements.

BACKGROUND OF INVENTION

(1) *Field of the invention*

This invention relates to stringers for sliding clasp fasteners of a type in which the fasteners each have coupling elements which are at least partially concealed when viewed from one side of the fastener. This type of fastener will be referred to throughout the specification as the "concealed element type" of fastener.

(2) *Description of prior art*

Concealed element type of fastener is known in which each fastener has two stringers each comprising a carrier tape and a series of coupling elements formed from a single filament so that the elements are interconnected. In one construction of this type of fastener having interconnected elements, it has been proposed to secure the series of elements adjacent to one edge of its respective tape by sewing threads with the coupling head portions of the elements initially facing away from the edge of the tape, the tape then being folded to provide a fold which will lie at or adjacent the centre line of the assembled fastener, and also to provide a tape portion for securing the fastener to a garment. In this construction of fastener, each tape may be sewn onto a garment by stitching located adjacent the fold of the tape. Also it is possible to provide this fastener construction with a slider which has a slider body extending around the elements and between the elements and the tape portion and towards the fold to retain the slider upon the fastener. However, in this construction any lateral loads imposed upon the tapes are carried by the stitching which holds the elements to the tapes. In another construction of this type of fastener, it is proposed to provide each tape with a series of apertures by omitting certain of the warp threads, the series of elements projecting through the apertures with weft threads lying between adjacent elements. In the latter construction, lateral loads applied to the tapes are imposed directly upon the weft threads but as it is not possible to locate stitching through the tapes adjacent to the coupling head portions of the elements, the slider cannot extend around the elements the required amount to retain the slider upon the elements. In this case, therefore, it is necessary to provide part of the slider body on the side of the tape remote from the elements to retain the slider in place.

*Summary of invention*

According to the present invention, a stringer for a sliding clasp fastener of the concealed element type comprises a stringer tape provided along its length with an apertured portion having a series of apertures, a tape portion on one side of the apertured portion which is wider than the apertured portion, and a series of coupling elements, the coupling elements projecting through the apertures in the tape and the tape having a fold formed on one side of the series of elements, so that the tape portion extends from the fold across the coupling elements in a direction away from coupling head portions of the elements so as at least partially to conceal said one side of the elements, the fold lying in engagement with at least one abutment which prevents or restricts movement of the fold across the elements in a direction away from the coupling head portions, and the tape portion being free of the elements to allow for relative movement of the coupling elements and the tape portion to unfold the tape.

The series of coupling elements may be held upon the tape solely by gripping engagement of the elements by the tape at the sides of the apertures.

The abutment may be a member which is additional to the tape and the elements and is provided upon said side of the elements. This member may be in the form of a bead or braid which is secured on the said side of the elements or alternatively, it may be a line of stitching preferably chain stitching, or a plastics member extending along said side of the elements.

However, in a construction in which a single filament is shaped into meander form to provide coupling elements which are interconnected by interconnecting portions of the filament extending between legs of the coupling elements, abutments may be provided by the elements. This may be effected by the legs of each element on the one side of the series of elements being shorter than those on the other side and the interconnecting portions which extend between the shorter legs forming abutments for the fold.

Alternatively, the elements on said one side of the series have portions which extend from the coupling head portions to portions of the elements remote from the coupling head portions and which are shaped to provide, at positions intermediate their ends, the abutments which are directed towards the coupling head portions. In a case wherein the series of elements are U-shaped in a lateral cross-section of the stringer and are interconnected and provided by a single filament, the portions of the elements are legs of the elements on said one side of the series which, at positions intermediate their ends, are cranked away from legs on the other side of the series to provide the abutments.

In yet a further construction, the tape has a tape portion on the other side of the apertured portion which is relatively narrow compared with the tape portion on said one side of the apertured portion and the apertured portion of the tape extends from the fold to the other side of the series of elements, the tape then returning to said one side of the series of elements and the narrow tape portion being located between the elements and the wider tape portion being secured to the elements, and providing the abutment with which the fold lies in engagement.

The invention also includes a sliding clasp fastener incorporating two stringers as defined according to the invention above.

*Brief description of the drawings*

Embodiments of the invention will now be described, by way of example, with reference to the accompanying drawings, in which.

*Description of the preferred embodiments*

Figure 1:
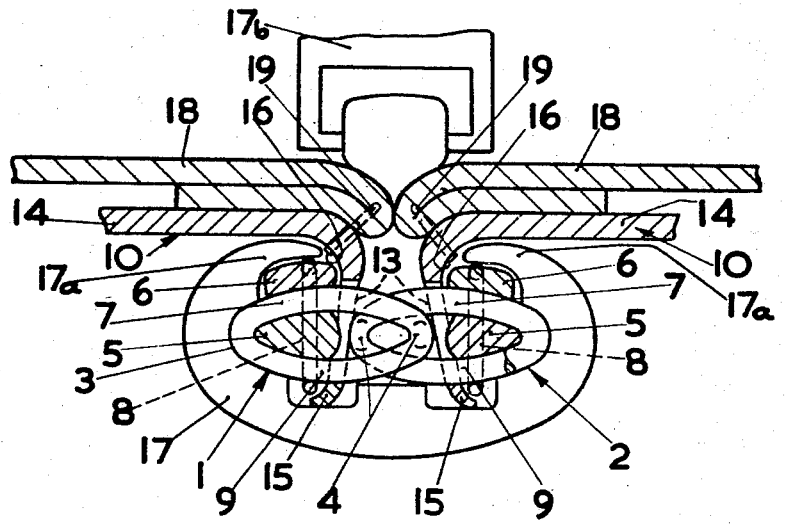
FIGURE 1 is a lateral cross-sectional view of a fastener forming a first embodiment, the fastener being secured to a garment and being shown with series of coupling elements interengaged.
Figure 2:
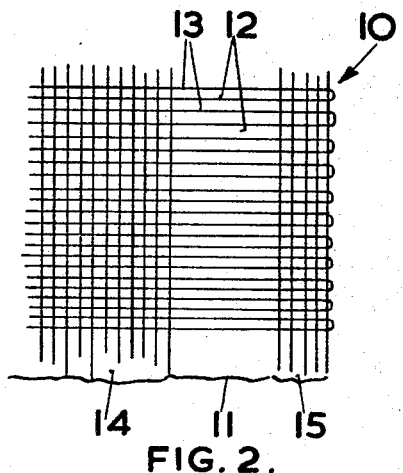
FIGURE 2 is a diagrammatic plan view of part of a tape of a stringer incorporated in the fastener of FIGURE 1.

In a first embodiment as shown in FIGURES 1 and 2, a sliding clasp fastener comprises two stringers 1 and 2 each comprising a single filament of plastics material (for example nylon) formed into a general helical shape to provide a series of interconnected coupling elements 3. The coupling elements having coupling head portions 4 and each series of elements is provided with an internal cord 5. A flat braid 6 is anchored to legs 7 at one side of each series of elements by stitching 8 which extends through the cord 5 and around the other legs 9 of the elements.

Each stringer also comprises a stringer tape 10 which, as is shown in FIGURE 2, is devoid of warp threads over an apertured portion 11 of its width so as to have a series of apertures 12 along its length, the apertures being formed between weft threads 13. Each aperture has a length (i.e. measured across the tape width) which is just sufficient to contain the width of an element 3, measuring across the legs 7 and 9 of the element. A tape portion 14 of the tape, which is wider than the width of the tape occupied by the apertures, is provided on one side of the series of apertures. A relatively narrow tape portion 15 of tape is provided on the other side of the series of apertures.

Figure 3:
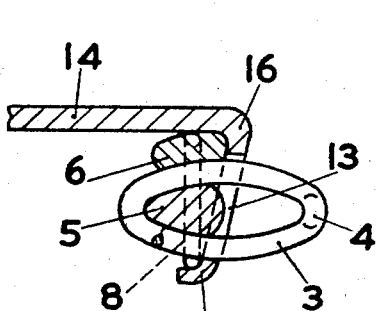
FIGURE 3 is a lateral cross-sectional view of one of the stringers of the fastener of FIGURE 1.

As shown in FIGURES 1 and 3, each series of elements 3 is assembled onto its tape by passing the head portions 4 through some of the apertures, with not more than one head portion to each aperture, so that the weft threads 13 engage the cord 5. In this position, the tape portions 14 and 15, respectively, lie adjacent the legs 7 and 9 of the elements. Each tape is then pressed in known manner to produce a fold 16 along the tape portion 14 adjacent the apertures so that this tape portion extends from the fold across the elements so as partially to conceal the elements when viewed from one side as shown in FIGURES 1 and 3. The part of the tape portion 14 at the fold 16 lies in engagement with the braid 6 which forms an abutment to prevent movement of the portion 14 across the elements away from the coupling head portions 4. However, the tape portion 14 of each stringer is not secured to the elements so that after the stringers have been assembled together and provided with a slider 17 for engaging and disengaging the series of elements, the tape portions 14 are unfolded to allow the tapes to be sewn to two parts 18 of a garment by lines of stitching 19 which, when the folds 16 are reformed, lie upon the folds. Further, the slider 17 comprises two extensions 17a which extend around the elements towards the folds and lie between the elements and tape portions 14 to assist in retaining the slider upon the elements. No part of the slider body is required, therefore, on the other side of the fastener and only a pull member 17b extending between the tapes adjacent disengaged parts of the elements lies on that side of the fastener.

A further accompanying advantage is that the weft threads of the two tapes directly take any lateral loads imposed upon the elements and tapes. Also, because the lines of stitching 19 are provided upon the folds 16, which is the closest possible position to the coupling head portions 4 of the elements, there is no tendency for the two parts 18 of the garment to separate to reveal the fastener.

The other embodiments now to be described all have similar advantages to those specified above with regard to the first embodiment because of their features of construction.

Figure 4:
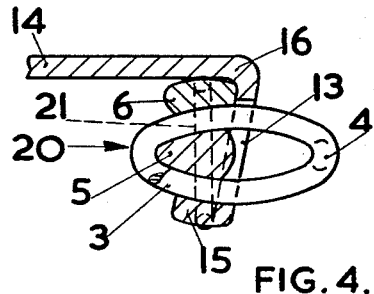
FIGURE 4 is a view similar to FIGURE 3 of a stringer forming a second embodiment.

In a second embodiment as shown in FIGURE 4, a stringer 20 of a fastener is basically of similar construction to each of those described in the first embodiment and parts identical with those of the first embodiment will bear the same reference numerals. The stringer 20 differs, however, from each of those of the first embodiment in that the tape portion 15 is sewn to the legs 9 of the elements by a line of stitching 21 which extends through the cord 5 and braid 6.

Figure 5:
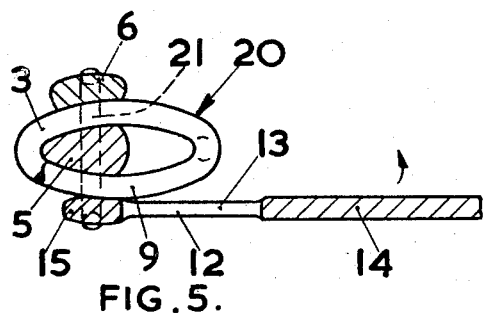
FIGURE 5 is a view similar to FIGURE 4 showing the stringer of FIGURE 4 at one stage in its manufacture.

The assembly of the stringer is made, as shown in FIGURE 5, by sewing the portion 15 of the tape to the elements before the head portions of the coupling elements are passed through the apertures 12. After sewing and passing of the head portions through the apertures, the fold 16 is formed, the braid 6 forming an abutment for the part of the tape portion 14 at the fold.

Figure 6:
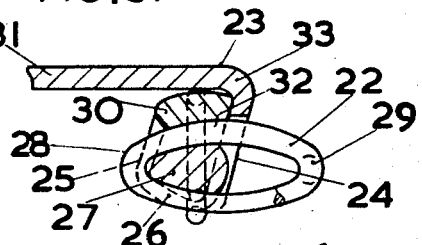

In a third embodiment as shown in FIGURE 6, a fastener comprises two stringers each incorporating a series of coupling elements 22 secured to a tape 23. The tape 23 is of similar construction to the tape 10 of the first embodiment in that it has apertures 24 formed between weft threads 25. Head portions 29 of the elements are located through the apertures 24. However, the lengths of the apertures are sufficient to allow the weft threads 25 to extend around a core 27, and to allow the parts 28 of the elements remote from the coupling head portions 29 to pass through the apertures so that a narrow tape portion 30 lies between a wide tape portion 31 and legs 32 of the elements.

Figure 7:
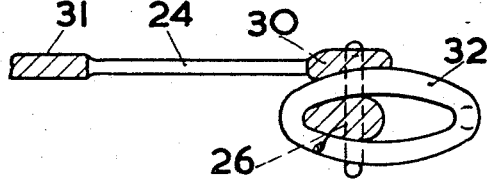
FIGURES 6 and 7 relate to a third embodiment and are, respectively, views similar to FIGURES 4 and 5.

The elements are assembled onto the tape (FIGURE 7) by sewing the tape portion 30 to the elements by a line of stitching 26 before passing the elements through the apertures. The stitching also sews the core 27 to the elements. The tape is then passed around the core in an anticlockwise direction, as viewed in FIGURE 7, to assume its position shown in FIGURE 6, a fold 33 being provided in the tape portion 31 so that this tape portion is folded around the end of the portion 30 and partially conceals the elements. In this position of the tape, the tape portion 30 forms an abutment for the part of the portion 31 at the fold.

Figure 8:
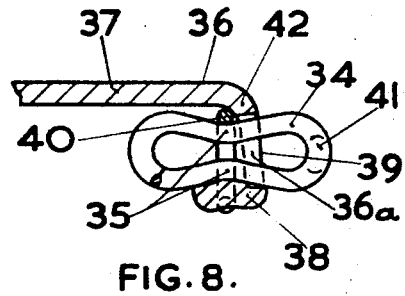
FIGURE 8 is a lateral cross-sectional view of a stringer forming a fourth embodiment.

In a fourth embodiment as shown in FIGURE 8, a stringer of a fastener comprises a series of coupling elements 34 which are provided with diverging and converging legs to form a waist 35 so that the elements are substantially dumbbell shaped. A tape 36, provided with apertures 36a defined by a wide tape portion 37, narrow tape portion 38 and weft threads 39, is secured to the elements by a line of stitching 40 which extends around the waist of the elements. Coupling head portions 41 of the elements are passed through the apertures and a fold 42 is provided in the tape portion 37 so that this tape portion partially conceals the elements when viewed from one side of the stringer. The part of the marginal portion 37 at the fold 42 engages the line of stitching which forms an abutment to prevent movement of the fold along the elements away from the coupling head portions, the stitching in turn being prevented from movement away from the coupling head portions by the diverging legs of the elements as they progress away from the waist 35.

Figure 9:
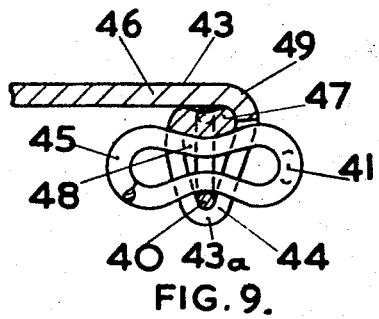
FIGURES 9 and 10 are views similar to FIGURE 8 of modifications of the fourth embodiment.

In a modification of the fourth embodiment shown in FIGURE 9, the apertures 43a in a tape 43 are sufficiently long (i.e. measured across the tape width) that weft threads 44 at the sides of the apertures extend around the line of stitching 40 on the side of the elements remote from a wide tape portion 46, and ends 45 of the elements remote from the coupling head portions 41 pass through the apertures. A narrow tape portion 47 of the tape is secured by the line of stitching to legs 48 of the elements in a position between the legs and the tape portion 46 to act as an abutment for the part of the tape portion 46 lying in a fold 49.

Figure 10:
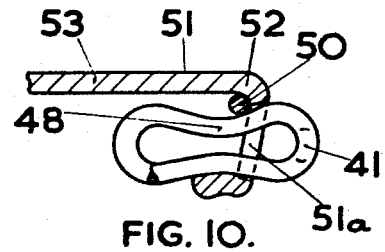

In another modification of the fourth embodiment shown in FIGURE 10, instead of having a line of stitching 40 to form an abutment, an abutment is a plastics member consisting of a rectilinear plastics filament 50 fused along the legs 48 of the elements. In this construction, the coupling head portions 41 of the elements are passed through apertures 51a in a tape 51 and the elements remain in position within the apertures solely by engagement of the elements by weft threads at the sides of the elements and without securing means being necessary, unless positive steps are taken to remove them. A part of the tape forming a fold 52 in a wide tape portion 53 lies in abutting engagement with the filament 50.

Figure 11:
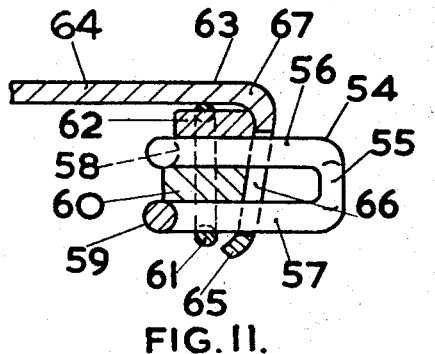
FIGURES 11, 12 and 13 are lateral cross-sectional views of stringers forming fifth, sixth and seventh embodiments.

In a fifth embodiment shown in FIGURE 11, a stringer comprises a single filament of plastics material formed into a meander of known construction to define interconnected U-shaped coupling elements 54 having head portions 55, and legs 56 and 57 one at each end of the head portions, interconnecting portions 58 and 59, respectively, connecting the legs 56 and the legs 57 of adjacent elements.

A spacing cord 60 is located between the legs 56 and 57 of the elements and is secured in position by a line of stitching 61 which also secures a flat braid 62 along the legs 56. A tape 63 is provided with a wide tape portion 64 and narrow tape portion 65 one on each side of a series of apertures which are partly defined by weft threads 66. The elements are assembled onto the tape by passing the head portions 55 through the apertures until the weft threads engage the cord 60 as shown in FIGURE 11. A fold 67 is then produced in the wide tape portion, the braid 62 acting as an abutment for the part of the tape forming the fold. The elements are held in the apertures solely by the engagement of the elements by the weft threads 66.

In a modification of the fifth embodiment (not shown) the narrow tape portion 65 is secured to the elements by the line of stitching 61.

Figure 12:
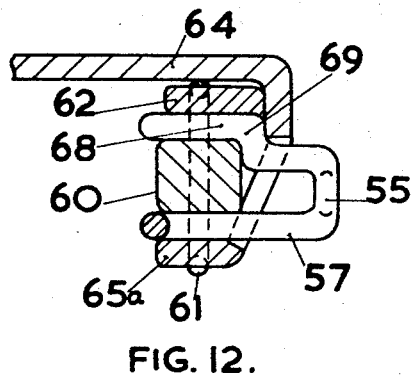

In a sixth embodiment as shown in FIGURE 12, a stringer which is basically of similar construction to that of the fifth embodiment is illustrated with the same reference numerals for identical parts. Instead of the coupling elements having straight legs 56, however, legs 68 are provided which have outwardly cranked portions 69 intermediate their ends. In this construction, the cranked portions 69 also form abutments to engage the wide tape portion in a position adjacent the fold to assist the braid 62 in preventing movement of the wide tape portion away from the coupling head portions 55 of the elements. In this construction, another point of difference is that a narrow tape portion 65a of the tape is secured by the line of stitching to the legs 57.

Figure 13:
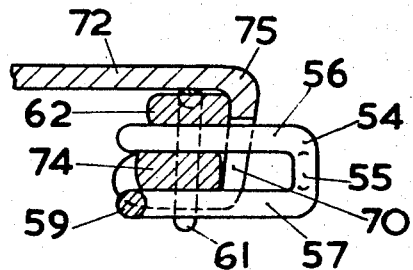
Figure 15:
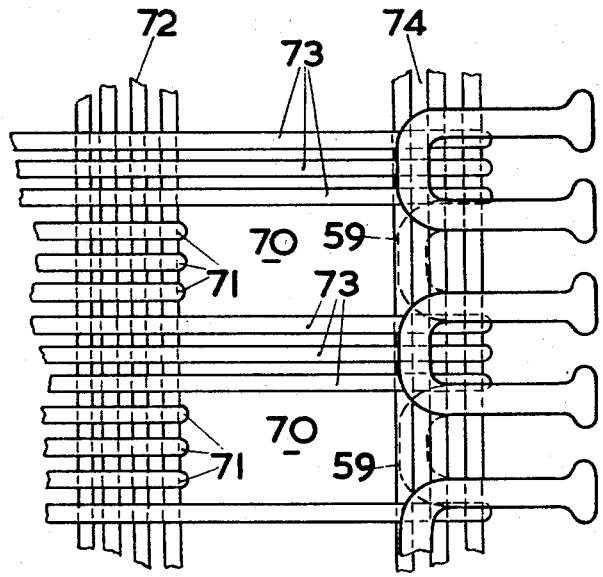
FIGURE 15 is a plan view of the stringer of FIGURE 13 shown at its stage of manufacture illustrated by FIGURE 14.

In a seventh embodiment shown in FIGURE 13, a stringer is basically of similar construction to that of the fifth embodiment except that, in this case, the cord 60 is omitted and the narrow tape portion is located between the legs 56 and 57 of the elements. Because the tape is secured in this manner, apertures 70 in the tape are required to be sufficiently wide, in the longitudinal direction of the tape, to allow the interconnecting portions 59 between the elements to pass through the apertures. As is shown in FIGURE 15, the apertures 70 are provided of sufficient width by extending groups 71 of weft threads only around the warp threads of a wide tape portion 72 while other groups 73 of weft threads extend also around a narrow tape portion 74.

Figure 14:
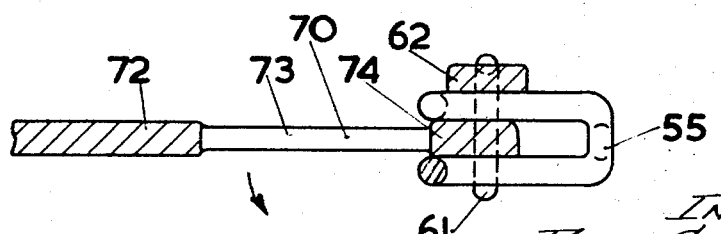
FIGURE 14 is a lateral cross-sectional view of the stringer of FIGURE 13 during one stage of its manufacture.

As shown in FIGURE 14, the elements are assembled onto the tape before folding by stitching the narrow tape portion 74 to the elements with stitching 61 which also secures the braid 62 into position. The tape is then turned in an anticlockwise direction as shown in FIGURE 14 around its portion 74 to pass the coupling head portions 55 through the apertures 70. In its final position, shown in FIGURE 13, a fold 75 is provided in the wide tape portion which then conceals parts of the elements when viewed from one side of the fastener, the braid 62 forming an abutment for the part of the tape in the fold.

Figures 16, 18:
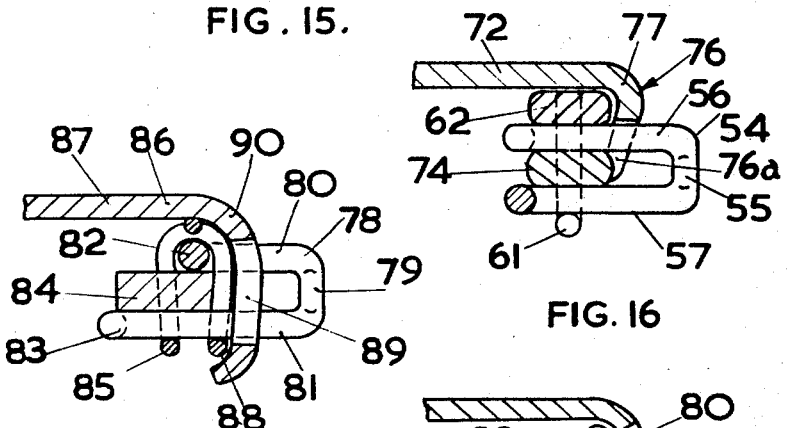
FIGURE 16 is a lateral cross-sectional view of an eighth embodiment.
FIGURE 18 is a lateral cross-sectional view of a stringer forming a ninth embodiment.

In an eighth embodiment as shown in FIGURE 16 a stringer is basically of similar construction to that described in the seventh embodiment, and the same reference numerals are used for identical parts. The stringer comprises a stringer tape 76 which is of similar construction to the tape of the seventh embodiment but the lengths of the apertures 76a across the tape are not so great as described in the seventh embodiment. In contrast, the apertures are of length sufficient to allow the tape to be located in the position shown in FIGURE 17 during the assembly of the fastener.

The stringer is made by locating the narrow tape portion 74 between the legs 56 and 57 (FIGURE 17) with the head portions 55 of the elements located in the apertures in the tape, two head portions to each aperture. The braid 62 is then located in position and is secured to the elements, together with the narrow tape portion 74 by stitching 61. The tape is then turned in an anticlockwise direction around its portion 74 to pass the coupling head portions 55 completely through the apertures. In the final tape position, shown in FIGURE 16, a fold 77 is provided in the wide tape portion 72 which then conceals parts of the elements, the braid 62 forming an abutment for the part of the tape in the fold.

In a ninth embodiment shown in FIGURE 18, a stringer comprises a single plastics filament formed into a meander to define a series of interconnected U-shaped coupling elements 78 each having a coupling head portion 79 and legs 80 and 81. Interconnecting portions 82 and 83, respectively, connect the legs 80 and 81 of adjacent elements. The legs 80 as shown in FIGURE 18 are shorter than the legs 81. A cord 84 lies between the legs 80 and 81 of the elements, the cord being held in position by stitching 85 which passes through the cord, around the legs 81, and around the interconnecting portions 82.

A stringer tape 86 provided with a wide tape portion 87, narrow tape portion 88 and weft threads 89 passing between the portions to define apertures, receives the elements by passage of the head portions 79 through the apertures. A fold 90 provided in the portion 87 of the tape results in this portion of the tape extending over the interconnecting portions 82 of the elements to conceal parts of the elements, the portions 82 acting as abutments for the parts of the tape in the fold. In this construction, the elements are retained in the apertures solely by the tape threads engaging the elements.

Figures 17, 19:
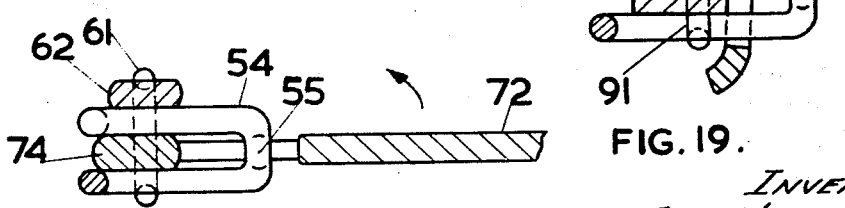
FIGURE 17 is a similar view to FIGURE 16 of the stringer of the eighth embodiment during one stage of its manufacture.
FIGURE 19 is a view similar to FIGURE 18 of a modification of the ninth embodiment.

In a modification of the ninth embodiment shown in FIGURE 19, a stringer is of construction similar to that described in the ninth embodiment except that instead of stitching 85 passing around the interconnecting portions 82, a line of stitching 91 extends around legs 80 in a position adjacent the portions 82.

In a modification of each of the embodiments described in which a braid forms the abutment on one side of the elements, the braid is replaced by a line of chain-stitching which extends over the legs of the elements in a position in engagement with the fold to form an abutment for the portion of the tape in the fold.

I claim:

1. A stringer for a sliding clasp fastener of the concealed element type comprising a stringer tape provided along its length with an apertured portion formed with a series of apertures, a tape portion on one side of the apertured portion which is wider than the apertured portion, a series of interconnected coupling elements formed from a single filament and having coupling head portions, the elements being mounted upon the tape with the coupling head portions projecting through the apertures in the tape, the tape having a fold formed on one side of the series of elements with the tape portion extending from the fold across the coupling elements in a direction away from the coupling head portions partially to conceal said one side of the elements wherein the improvement comprises at least one elongated abutment extending longitudinally along the coupling elements having portions positioned adjacent and in engagement with the inner surface of said fold at said tape portion and on the side of the fold remote from the coupling head portions to at least restrict movement of the fold across the elements in a direction away from the coupling head portions, and the tape portion and elements are relatively movable to allow for unfolding of the tape at the fold.

2. A stringer according to claim 1 wherein the tape forms sides to the apertures and the series of coupling elements is held upon the tape solely by gripping engagement of the elements by the tape at the sides of the apertures.

3. A stringer according to claim 1 wherein the abutment is a member which is additional to the tape and to the elements and is provided upon said one side of the series of elements between the elements and the tape portion.

4. A stringer according to claim 3 wherein the abutment is a bead.

5. A stringer according to claim 3 wherein the abutment is a line of stitching.

6. A stringer according to claim 3 wherein the abutment is a plastics member.

7. A stringer according to claim 1 wherein the coupling elements are U-shaped in a lateral cross-section of the stringer, the elements having first legs on said one side of the series of elements and second legs on the other side of the series, the first legs being shorter than the second legs, the filament providing interconnecting portions which extend between and connect first legs of adjacent elements and also provide abutments lying in engagement with the fold.

8. A stringer according to claim 1 wherein the elements on said one side of the series have abutment portions which extend from the coupling head portions to portions of the elements remote from the coupling head portions and which are shaped to provide, at positions intermediate their ends, the abutments which are directed towards the coupling head portions.

9. A stringer according to claim 8 wherein the elements are U-shaped in a lateral cross-section of the stringer, the elements having first legs on said one side of the series which are the abutment portions, and second legs on the other side of the series, the first legs, at positions intermediate their ends, being cranked away from the second legs to provide the abutments.

10. A stringer according to claim 5 wherein each of said elements has two legs which extend away from its coupling head portion and converge and then diverge as they extend from the coupling head portion to form a waist, and the line of stitching extends around the waists of the elements.

11. A stringer according to claim 12 wherein the tape has a tape portion on the other side of the apertured portion which is relatively narrow compared with the tape portion on said one side of the apertured portion, and the apertured portion of the tape extends from the fold to the other side of the series of elements, the tape then returning to said one side of the series of elements and the narrow tape portion being located between the elements and wider tape portion, being secured to the elements, and providing the abutment with which the fold lies in engagement.

12. A stringer according to claim 5 wherein each of said elements has two legs which extend away from its coupling head portion and converge and then diverge as they extend from the coupling head portion to form a waist.

References Cited

UNITED STATES PATENTS 3,136,016   6/1964   Firing _____ 24—205.1

FOREIGN PATENTS 216,856   8/1958   Australia.
211,106   11/1940   Switzerland.

BERNARD A. GELAK, *Primary Examiner.*